E. DOBSON.
AUTOMATIC SAFETY CRANK.
APPLICATION FILED MAR. 6, 1918.
1,370,791.
Patented Mar. 8, 1921.
4 SHEETS—SHEET 1.
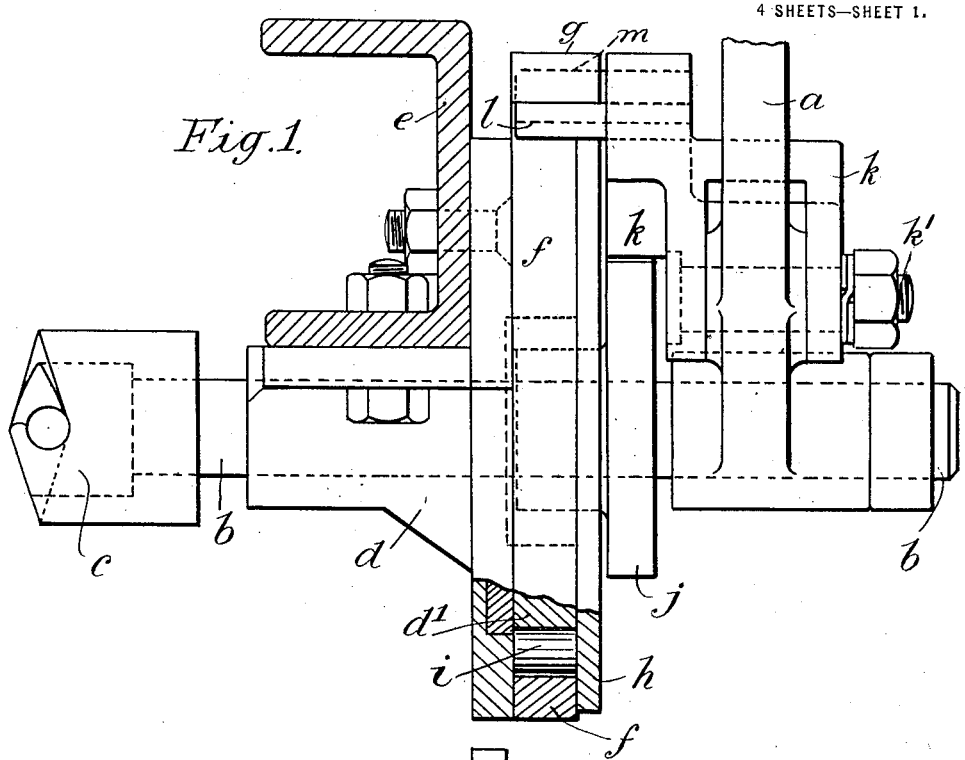
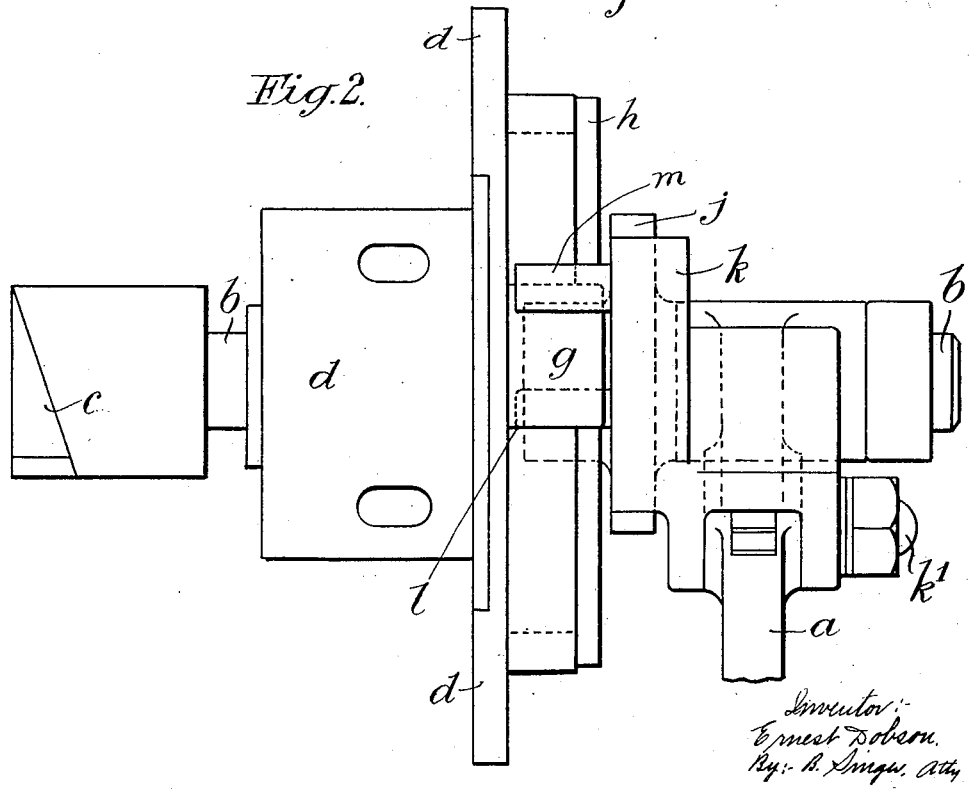

E. DOBSON.
AUTOMATIC SAFETY CRANK.
APPLICATION FILED MAR. 6, 1918.
1,370,791.
Patented Mar. 8, 1921.
4 SHEETS—SHEET 2.
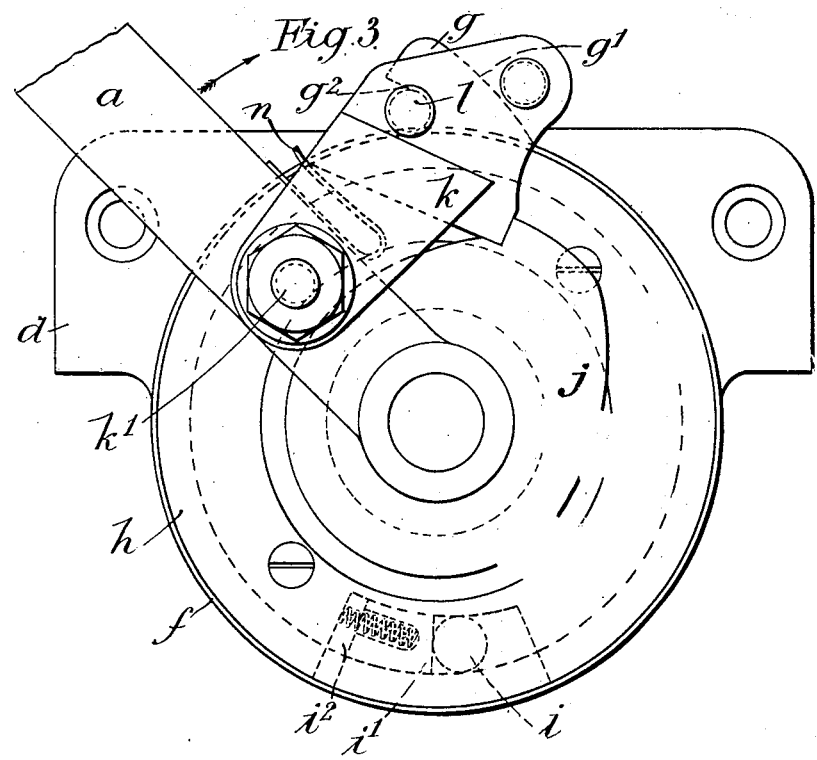
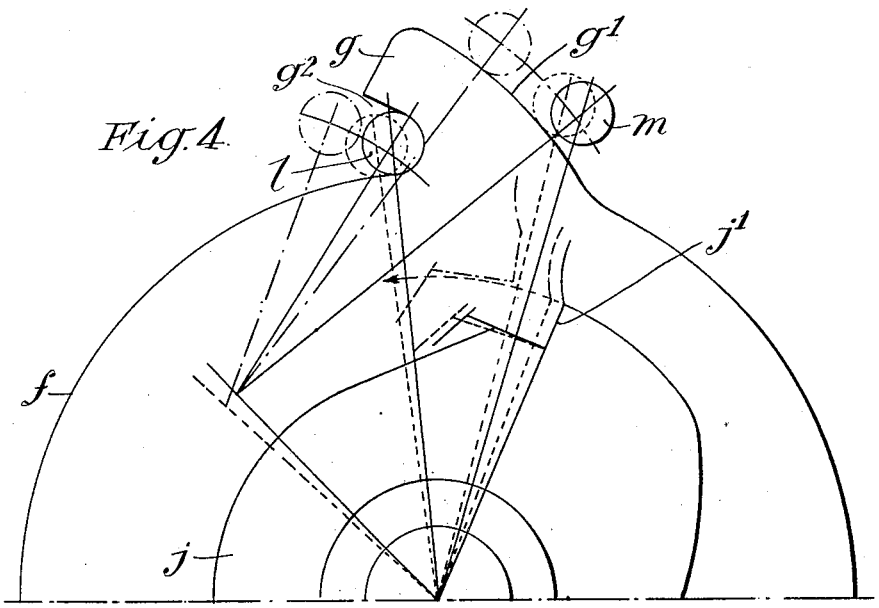

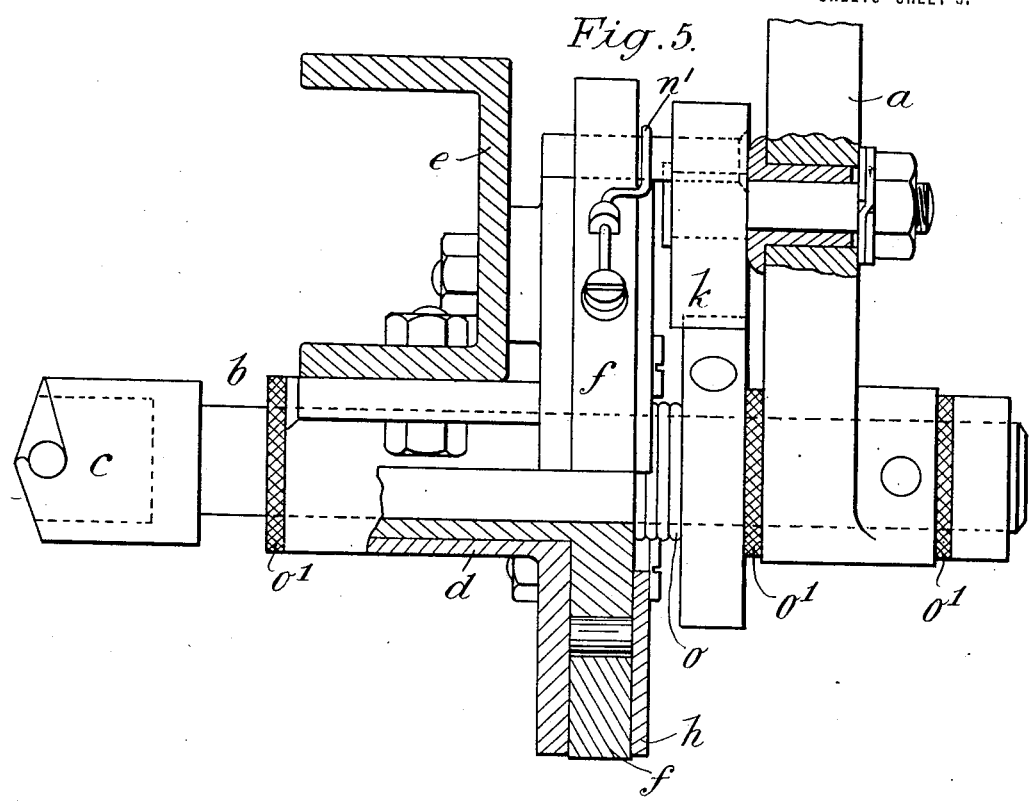
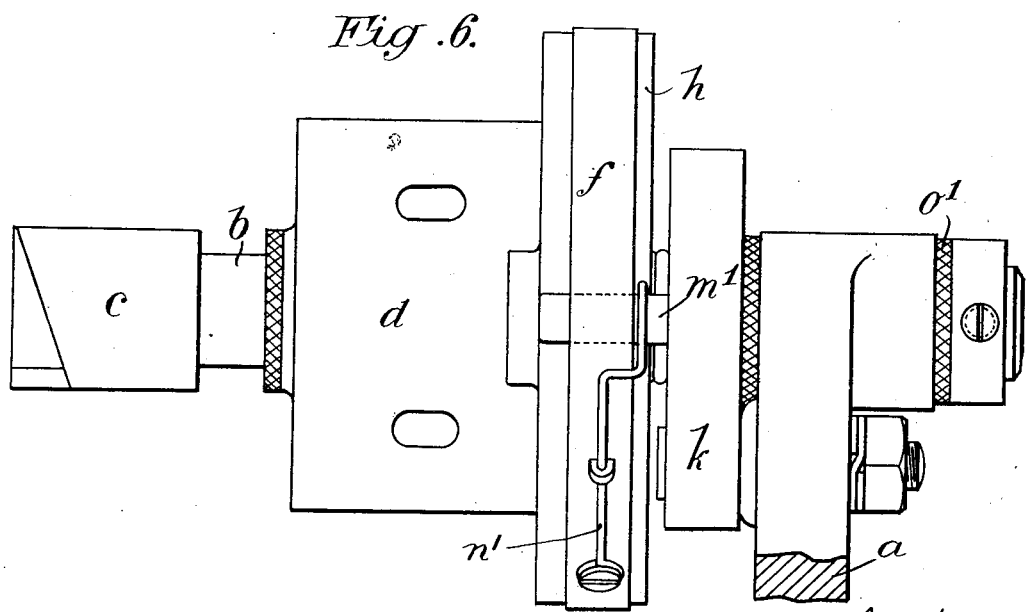

E. DOBSON.
AUTOMATIC SAFETY CRANK.
APPLICATION FILED MAR. 6, 1918.
1,370,791.
Patented Mar. 8, 1921.
4 SHEETS—SHEET 4.
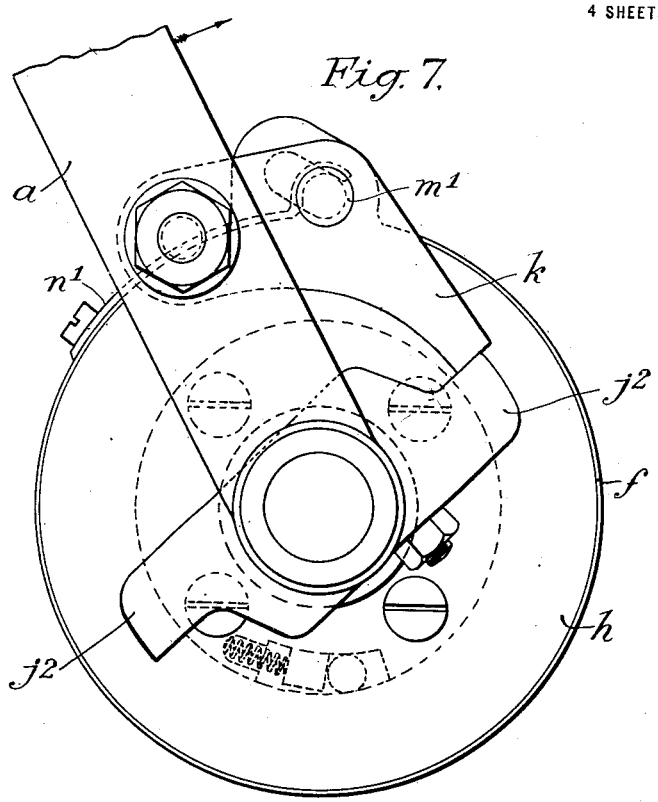
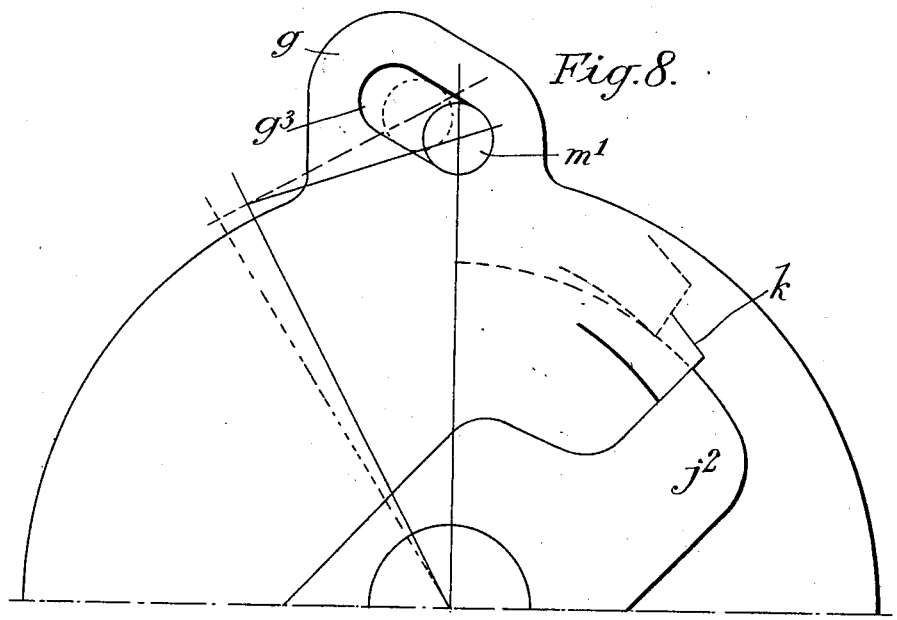

UNITED STATES PATENT OFFICE.

ERNEST DOBSON, OF WIMBLEDON, ENGLAND.

AUTOMATIC SAFETY-CRANK.

1,370,791.   Specification of Letters Patent.   Patented Mar. 8, 1921.

Application filed March 6, 1918. Serial No. 220,804.

*To all whom it may concern:*

Be it known that I, ERNEST DOBSON, a subject of the King of Great Britain and Ireland, whose post-office address is Morden Road, Wimbledon, S. W. 19, England, have invented certain new and useful Improvements in Automatic Safety-Cranks, of which the following is a specification.

This invention relates to clutch mechanism for coupling the starting handles or hand cranks to the crank shafts of internal combustion engines or for other purposes where the direction of rotation of the driven member is liable to be reversed and it is undesirable that the driving member should take part in such reversal, and has for its object to provide a light and compact clutch device which shall be positively held in engagement in the forward direction of rotation but shall be automatically and quickly released without transmitting shock to the driving member should a reversal of the driven member take place.

According to this invention the improved clutch mechanism comprises a member such as a free-wheel ring which can rotate freely in the forward direction but is held against rotation in the reverse direction by suitable means, a disk or collar mounted adjacent to and coaxial with the said ring and arranged to transmit the drive to a shaft, and a pawl mounted on a rotatable driving member and engaging in a notch or against a stop on the disk and also carrying two pins arranged to coöperate with a lug or projection on the free-wheel ring, one of said pins being positioned to engage on an inclined face on the lug and the other to engage a recess in the rear end of the lug when the driving member is rotated in the forward direction thus driving the free-wheel ring around with the driving member. By the engagement of the pin in the recess of the lug the pawl is also positively held in the notch of the flange or disk which transmits the drive to the shaft or other driven member. When a reversal of the driven member takes place the inclined face of the projection or lug on the free-wheel ring which as before described is locked against backward rotation, operates on the pin which rides over it to raise the pawl out of engagement with the notched disk or flange, thereby releasing the driving member. If desired the pawl may be both held in engagement and released by a single pin working in a suitably shaped slot.

In the accompanying drawings:

Figure 1 is a side elevation partly in section illustrating the application of the invention to the starting handle of a motor car.

Fig. 2 is a plan of the same.

Fig. 3 is a front view.

Fig. 4 is a diagram illustrating the releasing movement.

Figs. 5 to 8 are similar views to Figs. 1 to 4 showing a modified form of construction.

In the form of the invention as illustrated in Figs. 1 to 4 where it is shown applied to the starting handle of a motor car to prevent shock or injury to the hand due to a sudden reversal of the crank shaft as a result of premature ignition or back-fire in the cylinder while starting the motor, the starting handle $a$ shown partly broken away is mounted to revolve freely on its shaft $b$ which is provided with the usual clutch $c$ at its inner end and mounted in a fixed bearing bracket $d$ bolted to the front channel member $e$ of the car frame by which the starting gear is supported. On the bracket $d$ is a circular flange or collar $d^1$ which forms a bearing for the free-wheel ring $f$ upon the periphery of which is a lug or projection $g$ formed with an inclined face $g^1$ on its forward edge and a recess $g^2$ in its rear edge. The ring $f$ is held on its bearing $d^1$ by an annular plate $h$ secured in position by screws and is free to move in the direction of rotation of the engine, but locked on the reverse motion by means of a roller $i$ and spring pressed follower $i^1$ arranged in a suitably tapering recess $i^2$ formed between the free-wheel ring $f$ and its support. A notched disk or flange $j$ which is fastened on the starting handle shaft $b$ is arranged to couple the starting handle $a$ with its shaft $b$ with the aid of a pawl $k$ having a bifurcated part pivoted on a bolt $k^1$ in the starting handle and carrying two pins $l$, $m$ projecting from the same face across the perimeter of the ring $f$ in the path of the lug or projection $g$ thereon. The nose of the pawl $k$ is normally held by the action of a spring $n$ with its pin $l$ bearing on the perimeter of the ring $f$ and its nose in position for engagement with the notch $j^1$ in the disk or flange $j$.

It will be seen that the relation between the flange $j$, pawl $k$ and ring $f$ is such that on the handle $a$ being rotated in the starting direction of rotation the pin $l$ on the pawl will engage in the recess $g^2$ in the lug $g$ on the free-wheel ring, and will thereby carry around the ring until the nose of the pawl $k$ engages the notch in the flange. In this position the other pin $m$ on the pawl will be resting on the inclined surface $g^1$ of the lug or projection $g$.

In this position the starting handle shaft can be freely rotated, and owing to the positive engagement of the pin $l$ in the recessed lug of the free-wheel ring it is impossible for the pawl to become disengaged from the notch in the flange.

On the occasion of a back-fire, however, the free-wheel ring $f$ becomes locked against backward rotation by the roller $i$ and the flange $j$ of the starting handle shaft on its reverse motion exerts a force on the nose of the pawl $k$ which would tend to reverse the direction of rotation of the handle see Fig. 4 but owing to the pin $m$ being engaged with the inclined surface $g^1$ on the locked ring $f$, the pawl is thereby lifted or forced outward out of engagement with the notch in the flange thus allowing the shaft to continue its reverse motion without affecting the handle.

By suitably shaping the pawl and choosing the positions of the pins with reference to each other and the pivot it is possible to get a release between the handle and the shaft with extremely little back movement of the handle.

The above description applies to the case where the pawl acts on the external faces of the disk and free-wheel. It may also be applied to internal faces in a similar way.

In the modified form of construction shown in Figs. 5 to 8 the pawl $k$ is pivoted adjacent the inner face of the starting handle and carries a single pin $m^1$ which engages in an inclined slot $g^3$ in a lug $g$ on the free-wheel ring $f$. A spring $n^1$ attached to the ring $f$ bears on the pin $m^1$ to maintain the pawl in position for engagement with its nose against either of two diametrically opposed stops or arms $j^2$ formed integral with a collar or boss secured on the starting handle $a$. It will be seen that in this case the nose of the pawl is curved and bears against a similar face on the arm $j^2$ to facilitate the releasing or throwing out of the pawl when the direction of rotation of the stop or arm $j^2$ is reversed, and the pin $m^1$ comes into action in a similar manner to that described with reference to the pin $m$ Fig. 4.

In Fig. 5 a spring $o$ and leather washers $o^1$ are shown inserted between the parts on the shaft to prevent rattling.

What I claim and desire to secure by Letters Patent is: —

1. In apparatus of the class described, a shaft, a bearing therefor, a starting handle mounted for turning movement on the shaft, a free member having a bearing concentric with the shaft and provided with spaced substantially tangential cam surfaces arranged one in advance of the other, a notched member fastened on said shaft, and a pawl pivotally mounted on the handle, arranged to engage the notch of said notched member and having means to coact with said cam surfaces of said free member to move the pawl to engaged or disengaged position according to the direction of movement of the shaft, and means to permit said free member to turn in one direction only.

2. In apparatus of the class described, a shaft, a bearing therefor, a starting handle mounted for turning movement on the shaft, a free member having a bearing concentric with the shaft and provided with a projection presenting spaced substantially tangential cam surfaces arranged one in advance of the other, a notched member fastened on said shaft and a pawl pivotally mounted on the handle, arranged to engage the notch of said notched member and having pins to coact respectively with same cam surfaces of said free member to move the pawl to engaged or disengaged position according to the direction of movement of the shaft, and means to permit said free member to turn in one direction only.

In testimony whereof I have affixed my signature.

ERNEST DOBSON.